(12) United States Patent
Ichisaka et al.

(10) Patent No.: US 9,444,103 B2
(45) Date of Patent: *Sep. 13, 2016

(54) ELECTRODE MIXTURE

(71) Applicant: DAIKIN INDUSTRIES, LTD., Osaka-shi, Osaka (JP)

(72) Inventors: Toshiki Ichisaka, Settsu (JP); Takashi Iguchi, Settsu (JP); Tomoyuki Fukatani, Settsu (JP); Kazunobu Uchida, Settsu (JP); Takuji Ishikawa, Settsu (JP); Norimasa Uesugi, Settsu (JP); Takahiro Kitahara, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 66 days.

This patent is subject to a terminal disclaimer.

(21) Appl. No.: 14/402,241

(22) PCT Filed: May 20, 2013

(86) PCT No.: PCT/JP2013/063980
§ 371 (c)(1),
(2) Date: Nov. 19, 2014

(87) PCT Pub. No.: WO2013/176093
PCT Pub. Date: Nov. 28, 2013

(65) Prior Publication Data
US 2015/0137028 A1   May 21, 2015

(30) Foreign Application Priority Data

May 21, 2012 (JP) ................................. 2012-116019
Oct. 11, 2012 (JP) ................................. 2012-226438
Jan. 21, 2013 (JP) ................................. 2013-008746

(51) Int. Cl.
H01M 4/62    (2006.01)
H01M 4/139   (2010.01)
H01M 4/525   (2010.01)

(52) U.S. Cl.
CPC ............ *H01M 4/623* (2013.01); *H01M 4/139* (2013.01); *H01M 4/525* (2013.01); *H01M 4/625* (2013.01); *Y02E 60/122* (2013.01)

(58) Field of Classification Search
CPC ..... H01M 4/623; H01M 4/625; H01M 4/139
USPC ........ 252/511, 519.14, 519.33, 521.5, 519.6, 252/500, 521.6
See application file for complete search history.

(56) References Cited

U.S. PATENT DOCUMENTS

| | | | |
|---|---|---|---|
| 5,246,796 A | 9/1993 | Nagamine et al. | |
| 5,415,958 A | 5/1995 | Takahashi et al. | |
| 6,265,107 B1 | 7/2001 | Shimizu et al. | |
| 9,350,023 B2 * | 5/2016 | Nakamura | H01M 4/0404 |
| 2011/0123863 A1 | 5/2011 | Choi et al. | |
| 2011/0318638 A1 | 12/2011 | Koh et al. | |
| 2015/0017532 A1 * | 1/2015 | Iguchi | H01M 4/623 429/217 |
| 2015/0137029 A1 * | 5/2015 | Ichisaka | H01M 4/139 252/182.1 |
| 2016/0141627 A1 * | 5/2016 | Hwang | H01M 4/623 252/182.1 |

FOREIGN PATENT DOCUMENTS

| | | |
|---|---|---|
| JP | 63-121262 A | 5/1988 |
| JP | 4-249859 A | 9/1992 |
| JP | 9-274920 A | 10/1997 |
| JP | 10-233217 A | 9/1998 |
| JP | 2001-19896 A | 1/2001 |
| JP | 2002-313345 A | 10/2002 |
| KR | 10-2011-0056151 A | 5/2011 |
| WO | 98/27605 A1 | 6/1998 |
| WO | 2010/092976 A1 | 8/2010 |
| WO | 2010/092977 A1 | 8/2010 |
| WO | 2011/002097 A1 | 1/2011 |

OTHER PUBLICATIONS

International Preliminary Report on Patentability dated Nov. 25, 2014 from the International Searching Authority in counterpart application No. PCT/JP2013/063978.
International Preliminary Report on Patentability dated Nov. 25, 2014 from the International Searching Authority in counterpart application No. PCT/JP2013/063980.
International Search Report for PCT/JP2013/063980 dated Aug. 6, 2013.
International Search Report for PCT/JP2013/063978 dated Aug. 6, 2013.

* cited by examiner

*Primary Examiner* — Douglas McGinty
(74) *Attorney, Agent, or Firm* — Sughrue Mion, PLLC

(57) ABSTRACT

The present invention aims to provide an electrode mixture which shows little change in viscosity even after 24 hours from the preparation of the mixture and enables production of an electrode having a high electrode density and excellent flexibility and is capable of giving excellent electric properties to the resulting cell. The present invention relates to an electrode mixture including a powdery electrode material; a binder; and an organic solvent, the binder including polyvinylidene fluoride and a fluorine-containing polymer including a polymer unit based on vinylidene fluoride and a polymer unit based on tetrafluoroethylene, the fluorine-containing polymer including the polymer unit based on vinylidene fluoride in an amount of 80.0 to 90.0 mol % based on all the polymer units, the polyvinylidene fluoride having a number average molecular weight of 150,000 to 1,400,000.

7 Claims, No Drawings

ELECTRODE MIXTURE

CROSS REFERENCE TO RELATED APPLICATIONS

This application is a National Stage of International Application No. PCT/JP2013/063980 filed May 20, 2013, claiming priority based on Japanese Patent Application Nos. 2012-116019 filed May 21, 2012, 2012-226438 filed Oct. 11, 2012 and 2013-008746 filed Jan. 21, 2013, the contents of all of which are incorporated herein by reference in their entirety.

TECHNICAL FIELD

The present invention relates to an electrode mixture. Specifically, the present invention relates to an electrode mixture intended to be used in a nonaqueous electrolyte secondary battery such as a lithium ion battery.

BACKGROUND ART

Nonaqueous electrolyte secondary cells such as lithium ion secondary batteries have been used in small-sized, portable electric and electronic devices (e.g. laptops, cellular phones, smartphones, tablet computers, ultrabooks) because they are high-voltage cells and have a high energy density, tend not to self-discharge, show less memory effect, and can be significantly lighter in weight. Nonaqueous electrolyte secondary cells are also being used in a wide range of applications, such as on-vehicle power sources for driving for automobiles or large-sized stationary power sources.

A technique for producing electrodes is a key factor in improving the energy density of nonaqueous electrolyte secondary cells. For example, electrodes of lithium ion secondary cells may be produced as follows. If a carbonaceous material such as coke or carbon is used as a negative electrode active material, the negative electrode may typically be prepared by powdering the carbonaceous material, dispersing the powdery material in a solvent together with a binder to prepare a negative electrode mixture, and applying the mixture to a negative electrode collector, followed by drying to remove the solvent and rolling the workpiece. In the present description, carbonaceous materials which merely absorb/release lithium ions are also referred to as active material. Similarly, the positive electrode may typically be produced by powdering a positive electrode active material (e.g., lithium-containing oxide), dispersing the powdery material in a solvent together with a conductive agent and a binder to prepare a positive electrode mixture, and applying the mixture to a positive electrode collector, followed by drying to remove the solvent and rolling the workpiece.

Thus, the electrodes are produced using an electrode mixture in the form of slurry obtained by dispersing, in an organic solvent, a powdery electrode material prepared from a positive electrode active material or a negative electrode active material and a binder.

Patent Literature 1 discloses an electrode for a nonaqueous cell, the electrode including a binder and an electrode active material. The binder is a fluorine-based polymeric copolymer mainly consisting of monomer units of vinylidene fluoride (A), hexafluoropropylene (B), and tetrafluoroethylene (C). The mol fractions $X_A$, $X_B$, and $X_C$ of the monomer units satisfy $0.3 \leq X_A \leq 0.9$, $0.03 \leq X_B \leq 0.5$, $0 \leq X_C \leq 0.5$, and $0.80 \leq X_A + X_B + X_C \leq 1$.

In the technique disclosed in Patent Literature 2, a lithium-containing oxide (e.g., $LiCoO_2$) as a positive electrode active material and graphite as a conductive agent are mixed with polyvinylidene fluoride to prepare a positive electrode mixture, and the mixture is dispersed in N-methylpyrolidone to prepare a slurry. The slurry is then applied to aluminum foil as a positive electrode collector. Separately, a carbonaceous material as a negative electrode active material and polyvinylidene fluoride are mixed to prepare a negative electrode mixture, and the mixture is dispersed in N-methylpyrolidone to prepare a slurry. The slurry is then applied to copper foil as a negative electrode collector. The coated collectors are each dried and compression-molded with a roller press machine and thereby processed into electrode sheets.

Patent Literature 3 discloses a nonaqueous electrolyte secondary cell including a positive electrode formed of a positive electrode collector retaining a positive electrode mixture and/or a negative electrode formed of a negative electrode collector retaining a negative electrode mixture, and a nonaqueous electrolyte. The positive electrode mixture contains a binder for a nonaqueous electrolyte secondary cell, the binder comprising a binary copolymer consisting of 50 to 80 mol % of vinylidene fluoride and 20 to 50 mol % of tetrafluoroethylene, a positive electrode active material, and a conductive material. The negative electrode mixture contains the binder and a negative electrode active material.

Patent Literature 4 discloses a binder for a nonaqueous electrolyte secondary cell, the binder comprising a copolymer of vinylidene fluoride and tetrafluoroethylene and a specific PVdF. However, this literature fails to describe stability of the electrode mixture or adhesion of the electrodes, which are important characteristics for the electrodes.

CITATION LIST

Patent Literature

Patent Literature 1: JP S63-121262 A
Patent Literature 2: JP H04-249859 A
Patent Literature 3: WO 98/27605
Patent Literature 4: WO 2010/092977

SUMMARY OF INVENTION

Technical Problem

Recently, demand for smaller and lighter, or thinner and lighter electronic devices has greatly increased, leading to need for cells with enhanced performances. Increases in electrode density (in capacity), in voltage, and in the amount of active materials of the electrodes (in other words, decrease in the amount of other materials such as binder) have been studied in order to improve energy density of cells. Moreover, for on-vehicle cells, reduction in resistance of the electrodes has been demanded to improve the output.

Further, since lithium ion secondary cells have a circular shape, a square shape, a shape of a laminate, or the like shapes, the electrode sheets are wound and pressed when introduced. This tends to cause the sheets to break or cause powdery electrode materials to fall off or peel off from the collector substrates. The electrodes are therefore also required to have flexibility. It is also important for the electrodes to have durability at high voltages.

However, conventional electrode mixtures which can give a flexible electrode disadvantageously show a decrease in viscosity about 24 hours from the preparation thereof, and electrodes produced from such mixtures have a reduced electrode density. In addition, recently there has been a trend of switching the positive electrode active material from $LiCoO_2$ to Ni-containing materials to achieve higher capacity and higher voltage. Positive electrode active materials with an increased Ni content are more basic than $LiCoO_2$ and therefore tend to cause gelation of the electrode mixture.

The present invention is devised in view of the above situation of the art and aims to provide an electrode mixture which shows little change in viscosity even after 24 hours from the preparation of the mixture and enables production of an electrode having high electrode density and excellent flexibility and is capable of giving excellent electric properties to the resulting cell.

Solution to Problem

The inventors have found out that an electrode mixture containing a binder that contains a specific fluorine-containing polymer and polyvinylidene fluoride can prevent reduction in viscosity and enables production of an electrode having a high electrode density and excellent flexibility, and have completed the present invention. Moreover, a cell including the resulting electrode is better in cell properties than the cells including conventional electrodes.

Accordingly, the present invention relates to an electrode mixture comprising: a powdery electrode material; a binder; and an organic solvent, the binder comprising polyvinylidene fluoride and a fluorine-containing polymer comprising a polymer unit based on vinylidene fluoride (VdF) and a polymer unit based on tetrafluoroethylene (TFE), the fluorine-containing polymer comprising the polymer unit based on vinylidene fluoride in an amount of 80.0 to 90.0 mol % based on all the polymer units, the polyvinylidene fluoride having a number average molecular weight of 150,000 to 1,400,000.

The polyvinylidene fluoride preferably has a number average molecular weight of 200,000 to 1,300,000.

The fluorine-containing polymer preferably comprises the polymer unit based on vinylidene fluoride in an amount of 82.0 to 89.0 mol % based on all the polymer units.

The fluorine-containing polymer preferably consists only of the polymer unit based on vinylidene fluoride and the polymer unit based on tetrafluoroethylene.

The fluorine-containing polymer preferably has a weight average molecular weight of 50,000 to 2,000,000.

The electrode mixture preferably has a mass ratio of the fluorine-containing polymer to the polyvinylidene fluoride, represented by [(fluorine-containing polymer)/(polyvinylidene fluoride)], of 90/10 to 10/90.

The organic solvent comprises N-methyl-2-pyrolidone and/or N,N-dimethylacetamide.

The present invention is described in detail below.

The present invention relates to an electrode mixture comprising: a powdery electrode material; a binder; and an organic solvent, the binder comprising polyvinylidene fluoride and a fluorine-containing polymer comprising a polymer unit based on vinylidene fluoride (VdF) and a polymer unit based on tetrafluoroethylene (TFE), the fluorine-containing polymer comprising the polymer unit based on vinylidene fluoride in an amount of 80.0 to 90.0 mol % based on all the polymer units, the polyvinylidene fluoride having a number average molecular weight of 150,000 to 1,400,000.

Because of this configuration, the electrode mixture of the present invention shows little change in viscosity even after 24 hours from the preparation of the mixture. In addition, the mixture enables production of an electrode having a high electrode density and excellent flexibility. Further, the mixture can give excellent electric properties to the resulting cell.

The binder in the electrode mixture of the present invention includes: a fluorine-containing polymer including a polymer unit based on VdF and a polymer unit based on TFE; and polyvinylidene fluoride.

The fluorine-containing polymer contains the polymer unit based on VdF (hereinafter, also referred to as "VdF unit") in an amount of 80.0 to 90.0 mol % based on all the polymer units.

If the amount of the VdF unit is less than 80.0 mol %, the viscosity of the electrode mixture tends to greatly change with time. If the amount is more than 90.0 mol %, the electrode obtained from the mixture tends to have poor flexibility.

The fluorine-containing polymer preferably contains 80.5 mol % or more, and more preferably 82.0 mol % or more of the VdF unit based on all the polymer units. If the fluorine-containing polymer contains 82.0 mol % or more of the VdF unit, the cell including an electrode obtained from the electrode mixture of the present invention tends to have favorable cycle characteristics.

Also, the fluorine-containing polymer more preferably contains 89.0 mol % or less, even more preferably 88.9 mol % or less, and particularly preferably 88.8 mol % or less of the VdF unit based on all the polymer units.

The composition of the fluorine-containing polymer can be determined with an NMR analyzing device.

The fluorine-containing polymer may further contains, in addition to the VdF unit and the polymer unit based on TFE (hereinafter, also referred to as "TFE unit"), a polymer unit based on a monomer copolymerizable with VdF and TFE. Though the copolymer of VdF and TFE is sufficient to achieve the effects of the invention, adhesion can be further improved by further copolymerization with a monomer copolymerizable with VdF and TFE to the extent that the excellent swelling properties with nonaqueous electrolyte of the copolymer is not impaired.

The amount of the polymer unit based on a monomer copolymerizable with VdF and TFE is preferably less than 3.0 mol % based on all the polymer units in the fluorine-containing polymer. If the amount is 3.0 mol % or more, the copolymer of VdF and TFE generally tends to have significantly reduced crystallinity, and as a result, the copolymer tends to have reduced swelling properties with nonaqueous electrolyte.

Examples of the monomer copolymerizable with VdF and TFE include: unsaturated dibasic acid monoesters disclosed in JP H06-172452 A, including monomethyl maleate, citraconic acid monomethyl ester, citraconic acid monoethyl ester, and vinylene carbonate; compounds having a hydrophilic polar group such as $—SO_3M$, $—OSO_3M$, $—COOM$, $—OPO_3M$ (M represents an alkali metal), $—NHR^1$, or $—NR^2R^3$ (amine polar groups, $R^1$, $R^2$, and $R^3$ each represent an alkyl group) disclosed in JP H07-201316 A, including $CH_2=CH—CH_2—Y$, $CH_2=C(CH_3)—CH_2—Y$, $CH_2=CH—CH_2—O—CO—CH(CH_2COOR^4)—Y$, $CH_2=CH—CH_2—O—CH_2—CH(OH)—CH_2—Y$, $CH_2=C(CH_3)—CO—O—CH_2—CH_2—CH_2—Y$, $CH_2=CH—CO—O—CH_2—CH_2—Y$, and $CH_2=CHCO—NH—C(CH_3)_2—CH_2—Y$ (Y represents a hydrophilic polar group, $R^4$ represents an alkyl group);

maleic acid; and maleic acid anhydride. Examples of the monomer further include: hydroxylated allyl ether monomers such as $CH_2=CH-CH_2-O-(CH_2)_n-OH$ (3≤n≤8),

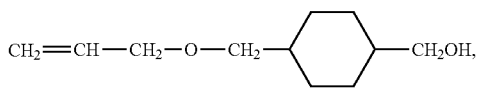

$CH_2=CH-CH_2-O-(CH_2-CH_2-O)_n-H$ (1≤n≤14), and $CH_2=CH-CH_2-O-(CH_2-CH(CH_3)-O)_n-H$ (1≤n≤14); allyl ether or ester monomers carboxylated and/or substituted with $-(CF_2)_n-CF_3$ (3≤n≤8) such as $CH_2=CH-CH_2-O-CO-C_2H_4-COOH$, $CH_2=CH-CH_2-O-CO-C_5H_{10}-COOH$, $CH_2=CH-CH_2-O-C_2H_4-(CF_2)_nCF_3$, $CH_2=CH-CH_2-CO-O-C_2H_4-(CF_2)_nCF_3$, and $CH_2=C(CH_3)-CO-O-CH_2-CF_3$.

It is deduced from the previous studies that compounds other than these polar group-containing compounds can also slightly reduce the crystallinity of the copolymer of vinylidene fluoride and tetrafluoroethylene, impart flexibility to the material, and thereby improve the adhesion to the collector formed from metallic foil of aluminum or copper. Therefore, also usable are unsaturated hydrocarbon monomers ($CH_2=CHR$, R represents a hydrogen atom, an alkyl group, or a halogen such as Cl) such as ethylene and propylene; and fluoromonomers such as chlorotrifluoroethylene, hexafluoropropylene, hexafluoroisobutene, 2,3,3,3-tetrafluoropropene, $CF_2=CF-O-C_nF_{2n+1}$ (n is an integer of 1 or greater), $CH_2=CF-C_nF_{2n+1}$ (n is an integer of 1 or greater), $CH_2=CF-(CF_2CF_2)_nH$ (n is an integer of 1 or greater), and $CF_2=CF-O-(CF_2CF(CF_3)O)_m-C_nF_{2n+1}$ (m and n are each an integer of 1 or greater).

In addition, fluorine-containing ethylenic monomers containing at least one functional group represented by Formula (1):

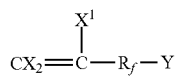

(1)

(wherein Y represents $-CH_2OH$, $-COOH$, a carboxylic acid salt, a carboxy ester group, or an epoxy group; X and $X^1$ are the same as or different from each other, each representing a hydrogen atom or a fluorine atom; and $R_f$ represents a C1 to C40 divalent fluorine-containing alkylene group or a C1 to C40 divalent fluorine-containing alkylene group containing an ether bond) can also be used. Copolymerization with one or two or more of these monomers can further improve the adhesion to the collector and prevent the electrode active material from peeling off from the collector even if charge and discharge are repeated, thereby achieving good charge and discharge cycle characteristics.

From the viewpoint of flexibility and chemical resistance, hexafluoropropylene and 2,3,3,3-tetrafluoropropene are particularly preferred among these monomers.

The fluorine-containing polymer thus may contain, in addition to the VdF unit and the TFE unit, other polymer units, but more preferably consists only of the VdF unit and the TFE unit.

The fluorine-containing polymer preferably has a weight average molecular weight (in terms of polystyrene) of 50,000 to 2,000,000. The weight average molecular weight is more preferably 80,000 or greater, and even more preferably 100,000 or greater, and more preferably 1,950,000 or smaller, even more preferably 1,900,000 or smaller, particularly preferably 1,700,000 or smaller, and most preferably 1,500,000 or smaller.

The weight average molecular weight can be measured by gel permeation chromatography (GPC) using N,N-dimethylformamide as a solvent at 50° C.

The fluorine-containing polymer preferably has a number average molecular weight (in terms of polystyrene) of 10,000 to 1,400,000. The number average molecular weight is more preferably 16,000 or greater, even more preferably 20,000 or greater, and more preferably 1,300,000 or smaller, and even more preferably 1,200,000 or smaller.

The number average molecular weight can be measured by gel permeation chromatography (GPC) using N,N-dimethylformamide as a solvent at 50° C.

The fluorine-containing polymer preferably has a tensile modulus of 800 MPa or smaller. If the tensile modulus is greater than 800 MPa, the resulting electrode tends not to have excellent flexibility. The tensile modulus is preferably 700 MPa or smaller.

The tensile modulus can be measured in accordance with the method of ASTM D-638 (1999).

The fluorine-containing polymer can be prepared by, for example, a method in which VdF and TFE monomers as polymer units and additives (e.g., polymerization initiator) are appropriately mixed and the mixture is subjected to suspension polymerization, emulsion polymerization, solution polymerization, or the like. The aqueous suspension polymerization and emulsion polymerization are preferred because these methods facilitate post-treatments.

In the polymerization, a polymerization initiator, a surfactant, a chain transfer agent, and a solvent can be used, and those conventionally known can be used.

The polymerization initiator can be an oil-soluble radical polymerization initiator or a water-soluble radical initiator.

The oil-soluble radical polymerization initiator may be a known oil-soluble peroxide, and representative examples thereof include: dialkyl peroxy carbonates such as diisopropyl peroxydicarbonate, di-n-propyl peroxy dicarbonate, and di-sec-butyl peroxy dicarbonate; peroxy esters such as t-butyl peroxy isobutyrate and t-butyl peroxy pivalate; dialkyl peroxides such as di-t-butyl peroxide; and di[perfluoro (or fluorochloro)acyl]peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutylyl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chlorohexafluorobutylyl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chlorohexafluorobutylyl-ω-chloro-decafluorohexanoyl-peroxide, ω-hydrododecafluoroheptanoyl-perfluorobutylyl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotriacontafluorodocosanoyl) peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleate, and t-butyl hydroperoxide. These peroxides may be used in combination with a reducing agent such as a sulfite or a sulfurous acid salt. The amount of the reducing agent may be 0.1 to 20 times the amount of the peroxide.

The surfactant may be a known surfactant, and examples thereof include nonionic surfactants, anionic surfactants, and cationic surfactants. Preferred among these are fluorine-containing anionic surfactants, and more preferred are C4 to C20 linear or branched fluorine-containing anionic surfactants which may contain an ether bond (in other words, an oxygen atom may be inserted between carbon atoms). The amount of the surfactant added (based on water as a polymerization medium) is preferably 50 to 5,000 ppm.

Examples of the chain transfer agent include hydrocarbons such as ethane, isopentane, n-hexane, and cyclohexane; aromatic compounds such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount of the chain transfer agent depends on the chain transfer constant thereof and is typically 0.01 to 20% by mass based on the polymerization solvent.

The solvent may be water, a mixed solvent of water and alcohol, or the like.

In the suspension polymerization, a fluorine-containing solvent may be used in combination with water. Examples of the fluorine-containing solvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$. Preferred are perfluoroalkanes. For easy suspension and cost savings, the amount of the fluorine solvent is preferably 10 to 150% by mass based on the amount of an aqueous medium.

The polymerization temperature is not particularly limited, and may be 0° C. to 100° C. The polymerization pressure can be appropriately determined considering other polymerization conditions such as the type and amount of the solvent used, vapor pressure, and polymerization temperature, and may typically be 0 to 9.8 MPaG.

If the suspension polymerization is performed using water as a disperse medium without a fluorine solvent, a suspension agent such as methyl cellulose, methoxylated methyl cellulose, propoxylated methyl cellulose, hydroxyethyl cellulose, hydroxypropyl cellulose, polyvinyl alcohol, polyethylene oxide, or gelatin is added in an amount of 0.005 to 1.0% by mass, preferably in an amount of 0.01 to 0.4% by mass, based on the water.

Polymerization initiators usable in this case include diisopropyl peroxydicarbonate, dinormalpropyl peroxydicarbonate, dinormalheptafluoropropyl peroxydicarbonate, isobutylyl peroxide, di(chlorofluoroacyl)peroxide, and di(perfluoroacyl)peroxide. The amount of the polymerization initiator is preferably 0.1 to 5% by mass based on the total amount of the monomer units (the total amount of vinylidene fluoride, the monomer(s) having an amido group, and optional monomer(s) copolymerizable with these monomers).

A chain transfer agent such as ethyl acetate, methyl acetate, acetone, ethanol, n-propanol, acetaldehyde, propylaldehyde, ethyl propionate, or carbon tetrachloride may be added to control the degree of polymerization of the resulting polymer. The amount of the chain transfer agent is typically 0.1 to 5% by mass, and preferably 0.5 to 3% by mass, based on the total amount of the monomer units.

The monomers are preferably charged in such an amount that the weight ratio (the total amount of the monomers): (water) should be 1:1 to 1:10, and more preferably 1:2 to 1:5. The polymerization is performed at a temperature of 10° C. to 50° C. for 10 to 100 hours.

The suspension polymerization easily provides the fluorine-containing polymer.

The binder further contains polyvinylidene fluoride (PVdF).

It is common in the art to blend the mixture with a plurality of binder polymers to change functions of the electrode. However, conventional mixtures prepared by adding a copolymer including TFE unit and a VdF unit to PVdF problematically show a decrease in viscosity after a long period of time from the preparation of the mixture.

The present invention is based on the finding that if the binder contains PVdF and the above fluorine-containing polymer, the mixture shows little change in viscosity even after 24 hours from the preparation of the mixture and can provide an electrode having a high density and excellent flexibility.

The PVdF may be a homopolymer consisting only of a polymer unit based on VdF or may include a polymer unit based on VdF and a polymer unit based on a monomer (a) copolymerizable with the polymer unit based on VdF.

Examples of the monomer (α) include vinyl fluoride, trifluoroethylene, trifluorochloroethylene, fluoroalkyl vinyl ethers, hexafluoropropylene, 2,3,3,3-tetrafluoropropene, and propylene. The examples also include unsaturated dibasic acid monoesters disclosed in JP-A H06-172452, including monomethyl maleate, monomethyl citraconate, monoethyl citraconate, and vinylene carbonate; compounds having a hydrophilic group such as $-SO_3M$, $-OSO_3M$, $-COOM$, and $-OPO_3M$ (M represents an alkali metal), and $-NHR^1$ and $-NR^2R^3$ (amine polar groups, $R^1$, $R^2$, and $R^3$ each represent an alkyl group) disclosed in JP H07-201316 A, including $CH_2=CH-CH_2-Y$, $CH_2=C(CH_3)-CH_2-Y$, $CH_2=CH-CH_2-O-CO-CH(CH_2COOR^4)-Y$, $CH_2=CH-CH_2-O-CH_2-CH(OH)-CH_2-Y$, $CH_2=C(CH_3)-CO-O-CH_2-CH_2-CH_2-Y$, $CH_2=CH-CO-O-CH_2-CH_2-Y$, and $CH_2=CHCO-NH-C(CH_3)_2-CH_2-Y$ (Y represents a hydrophilic polar group, $R^4$ represents an alkyl group); maleic acid; and maleic acid anhydride. Examples of the copolymerizable monomer further include: hydroxylated allyl ether monomers such as $CH_2=CH-CH_2-O-(CH_2)_n-OH$ (3≤n≤8),

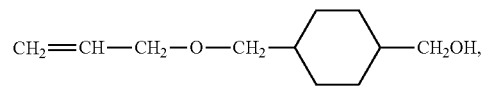

$CH_2=CH-CH_2-O-(CH_2-CH_2-O)_n-H$ (1≤n≤14), and $CH_2=CH-CH_2-O-(CH_2-CH(CH_3)-O)_n-H$ (1≤n≤14); allyl ether or ester monomers calboxylated and/or substituted with $-(CF_2)_n-CF_3$ (3≤n≤8) such as $CH_2=CH-CH_2-O-CO-C_2H_4-COOH$, $CH_2=CH-CH_2-O-CO-C_5H_{10}-COOH$, $CH_2=CH-CH_2-O-C_2H_4-(CF_2)_nCF_3$, $CH_2=CH-CH_2-CO-O-C_2H_4-(CF_2)_nCF_3$, and $CH_2=C(CH_3)-CO-O-CH_2-CF_3$.

It is deduced from the previous studies that compounds other than these polar group-containing compounds described above can slightly reduce the crystallinity of the PVdF, impart flexibility to the material, and thereby improves the adhesion to the collector formed from metallic foil of aluminum or copper. Therefore, also usable are monomers based on unsaturated hydrocarbon such as ethylene or propylene ($CH_2=CHR$, R represents a hydrogen atom, an alkyl group, or a halogen such as Cl); and fluoromonomers such as chlorotrifluoroethylene, hexafluoropropylene, hexafluoroisobutene, $CF_2=CF-O-C_nF_{2n+1}$ (n is an integer of 1 or greater), $CH_2=CF-C_nF_{2n+1}$ (n is an integer of 1 or greater), $CH_2=CF-(CF_2CF_2)_nH$ (n is an integer of 1 or greater), and $CF_2=CF-O-(CF_2CF(CF_3)O)_m-C_nF_{2n+1}$ (m and n are each an integer of 1 or greater).

Also usable are fluorine-containing ethylenic monomers containing at least one functional group represented by Formula (1):

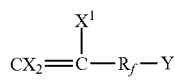

(wherein Y represents $-CH_2OH$, $-COOH$, a carboxylic acid salt, a carboxy ester group, or an epoxy group; X and X' are the same as or different from each other, each representing a hydrogen atom or a fluorine atom; and $R_f$ represents a C1 to C40 divalent fluorine-containing alkylene group or a C1 to C40 divalent fluorine-containing alkylene group containing an ether bond). Copolymerization with one or two or more of these monomers can further improve the adhesion to the collector and prevent electrode active material from peeling-off from the collector even if charge and discharge is repeated. Thereby, good charge-discharge cycle characteristics can be obtained.

The amount of the polymer unit based on the monomer (α) in the PVdF is preferably 5 mol % or less, and more preferably 4.5 mol % or less based on all the polymer units.

The PVdF preferably has a weight average molecular weight (in terms of polystyrene) of 50,000 to 2,000,000. The weight average molecular weight is more preferably 80,000 or greater, even more preferably 100,000 or greater, and more preferably 1,700,000 or smaller, and even more preferably 1,500,000 or smaller.

The weight average molecular weight can be determined by gel permeation chromatography (GPC) using N,N-dimethylformamide as a solvent at 50° C.

The PVdF has a number average molecular weight (in terms of polystyrene) of 150,000 to 1,400,000.

If the PVdF has a number average molecular weight of smaller than 150,000, the resulting electrode has reduced adhesion. If the PVdF has a number average molecular weight of greater than 1,400,000, gelation is more likely to occur during preparation of the electrode mixture.

The number average molecular weight is preferably 200,000 or greater, more preferably 250,000 or greater, and even more preferably 300,000 or greater, and preferably 1,300,000 or smaller, more preferably 1,200,000 or smaller, further preferably 1,000,000, and particularly preferably 800,000.

The number average molecular weight can be determined by gel permeation chromatography (GPC) using N,N-dimethylformamide as a solvent at 50° C.

The PVdF can be produced by any conventionally known method, such as a method including appropriately mixing VdF and the monomer (α) as polymer units with additives (e.g., polymerization initiator) and performing solution polymerization or suspension polymerization.

The mass ratio of the fluorine-containing polymer to the PVdF (fluorine-containing polymer)/(PVdF) is preferably 90/10 to 10/90, more preferably 80/20 to 15/85, and even more preferably 75/25 to 15/85.

The mass ratio within the above range can suppress decrease in viscosity of the mixture and enables production of an electrode having a high electrode density and excellent flexibility.

The binder may further contains, in addition to the fluorine-containing polymer and PVdF, other components usable in the binder, such as polymethacrylates, polymethyl methacrylate, polyacrylonitrile, polyimide, polyamide, polyamideimide, polycarbonate, styrene rubber, and butadiene rubber. The amount of the components other than the fluorine-containing polymer and PVdF is preferably 10 to 900% by mass based on the fluorine-containing polymer.

The amount of the binder is preferably 20% by mass or less, and more preferably 10% by mass or less in the electrode mixture. The amount of the binder is also preferably 0.1% by mass or more, and more preferably 0.5% by mass or more. If the amount of the binder is more than 20% by mass, the electrode obtained from the mixture has a high electric resistance and may fail to provide good cell properties. If the amount of the binder is less than 0.1% by mass, the mixture is unstable and the electrode obtained therefrom may disadvantageously fail to attach to the collector.

The electrode mixture of the present invention contains an organic solvent.

Examples of the organic solvent include: nitrogen-containing organic solvents such as N-methyl-2-pyrolidone, N,N-dimethylacetamide, and dimethylformamide; ketone solvents such as acetone, methyl ethyl ketone, cyclohexanon, methyl isobutyl ketone; ester solvents such as ethyl acetate and butyl acetate; ether solvents such as tetrahydrofuran and dioxane; and low-boiling general-purpose organic solvents such as mixed solvents of these solvents.

Preferred among these organic solvents are N-methyl-2-pyrolidone and N,N-dimethylacetamide because these allow the electrode mixture to have excellent stability and application properties.

The amount of the organic solvent can be appropriately determined depending on factors such as the thickness of the resulting electrode.

The electrode mixture of the present invention contains a powdery electrode material.

Examples of the powdery electrode material include nonaqueous cell electrode active materials, active materials for forming a polarizable electrode of an electric double layer capacitor, and mixtures of these active materials and conductive aids.

Examples of the nonaqueous cell electrode active material include positive electrode active materials and negative electrode active materials.

If the electrode mixture of the present invention contains a positive electrode active material, the electrode mixture is used as a positive electrode mixture. If the electrode mixture of the present invention contains a negative electrode active material, the electrode mixture is used as a negative electrode mixture.

The positive electrode mixture preferably contains a positive electrode active material and a conductive aid as the powdery electrode materials.

The positive electrode active material is not particularly limited as long as it can electrochemically absorb/release a lithium ion. The positive electrode active material is preferably a substance containing lithium and at least one transition metal. Examples thereof include lithium transition metal complex oxides and lithium-containing transition metal phosphoric acid compounds.

The transition metal in the lithium transition metal complex oxide is preferably V, Ti, Cr, Mn, Fe, Co, Ni, Cu, or the like. Specific examples of the lithium transition metal complex oxide include lithium/cobalt complex oxides such as $LiCoO_2$, lithium/nickel complex oxides such as $LiNiO_2$, lithium/manganese complex oxides such as $LiMnO_2$, $LiMn_2O_4$, and $Li_2MnO_3$, and those obtained by partially substituting the main transition metal atoms of these lithium transition metal complex oxides with other metals such as Al, Ti, V, Cr, Mn, Fe, Co, Li, Ni, Cu, Zn, Mg, Ga, Zr, or Si. Specific examples of such a substituted lithium transition metal complex oxide include $LiNi_{0.5}Mn_{0.5}O_2$, $LiNi_{0.85}Co_{0.10}Al_{0.05}O_2$, $LiNi_{0.82}CO_{0.15}Al_{0.03}O_2$, $LiNi_{0.80}Co_{0.15}Al0.05O_2$, $LiNi_{1/3}CO_{1/3}Mn_{1/3}O_2$, $LiMn_{1.8}Al_{0.2}O_4$, $LiMn_{1.5}Ni_{0.5}O_4$, and $Li_4Ti_5O_{12}$. In the positive electrode active materials containing Ni, increasing the proportion of Ni increases the capacity of the positive electrode active material. This will further improve the capacity of the cell. However, increasing the proportion of Ni further increases the basicity of the positive electrode active material. If the positive electrode mixture is prepared using such an active electrode material and a binder that consists only of PVdF, the PVdF chemically reacts, making the positive electrode mixture easily gel.

The transition metal in the lithium-containing transition metal phosphoric acid compound is preferably V, Ti, Cr, Mn, Fe, Co, Ni, Cu, or the like. Specific examples of the lithium-containing transition metal phosphoric acid compound include iron phosphates such as $LiFePO_4$, $Li_3Fe_2(PO_4)_3$, and $LiFeP_2O_7$, cobalt phosphates such as $LiCoPO_4$, and those obtained by substituting part of main transition metal atoms in these lithium-containing transition metal phosphate compounds with other metals such as Al, Ti, V, Cr, Mn, Fe, Co, Li, Ni, Cu, Zn, Mg, Ga, Zr, Nb, or Si.

Especially preferred are $LiCoO_2$, $LiNiO_2$, $LiMn_2O_4$, $LiNi_{0.82}Co_{0.15}Al_{0.03}O_2$, $LiNi_{0.80}CO_{0.15}Al_{0.05}O_2$, $LiNi_{1/3}CO_{1/3}Mn_{1/3}O_2$, and $LiFePO_4$ from the viewpoint of high voltage, high-energy density, and charge and discharge cycle characteristics.

These positive electrode active materials used may have a surface to which a substance having a composition different from that of the main positive electrode active materials adheres. Examples of the substance adhering to the surface include oxides such as aluminum oxide, silicon oxide, titanium oxide, zirconium oxide, magnesium oxide, calcium oxide, boron oxide, antimony oxide, and bismuth oxide, sulfuric acid salts such as lithium sulfate, sodium sulfate, potassium sulfate, magnesium sulfate, calcium sulfate, and aluminum sulfate, and carbonates such as lithium carbonate, calcium carbonate, and magnesium carbonate.

These substances may adhere to the surface of the positive electrode active material by, for example, a method including dissolving or suspending the substance into a solvent and impregnating the positive electrode active material with the solution (suspension), followed by drying; a method including dissolving or suspending a precursor of the substance into a solvent and impregnating the positive electrode active material with the solution (suspension), followed by heating to cause reaction; a method including adding the substance to a precursor of the positive electrode active material and firing them together, or the like methods.

The lower limit of the amount of the substance adhering to the surface is preferably 0.1 ppm by mass, more preferably 1 ppm by mass, and even more preferably 10 ppm by mass, and the upper limit is preferably 20% by mass, more preferably 10% by mass, and even more preferably 5% by mass, based on the positive electrode active material. The substance adhering to the surface can suppress oxidation of the nonaqueous electrolyte on the surface of the positive electrode active material and thereby improves the cell life. This effect, however, is insufficiently produced if the amount of the substance attached is too small. Too large an amount of the substance may inhibit the lithium ion from entering/leaving the positive electrode active material, which may increase resistance.

The positive electrode active material particles may have a conventional shape such as block, polyhedron, sphere, elliptical sphere, plate, needle, and pillar shapes. Particularly preferably, primary particles of the positive electrode active material agglomerate to form secondary particles, and the secondary particles have a sphere or elliptical sphere shape. Generally, charge and discharge of electrochemical elements cause expansion and contraction of the active material in the electrode. Stress due to this tends to cause deterioration such as breaking of the active material or disconnection of the conductive path. Therefore, positive electrode active material particles comprising secondary particles of agglomerated primary particles, which can relief the stress produced by expansion and contraction and prevent the deteriorations, are more preferred than single-particle substances consisting only of primary particles. Moreover, spherical or elliptical spherical particles are more preferred than axially oriented particles such as plate-like particles because spherical or elliptical spherical particles are less likely to be oriented when the electrode is formed and therefore reduce the expansion and contraction of the electrode during charge and discharge, and also because they are easily uniformly mixed with a conductive aid in preparation of the electrode.

The positive electrode active material typically has a tapped density of 1.3 $g/cm^3$ or greater, preferably 1.5 $g/cm^3$ or greater, more preferably 1.6 $g/cm^3$ or greater, and more preferably 1.7 $g/cm^3$ or greater. If the positive electrode active material has a tapped density smaller than the lower limit, increased amounts of dispersion medium, a conductive aid, and a binder are required when the positive electrode active material layer is produced. In such a case, the filling rate of the positive electrode active material in the positive electrode active material layer is limited, possibly resulting in limitation of the cell capacity. A metal complex oxide powder with a high tapped density leads to a positive electrode active material layer having a high density. Generally, the greater the tapped density, the better. The upper limit thereof is not particularly defined, but typically 2.5 $g/cm^3$ or smaller, and preferably 2.4 $g/cm^3$ or smaller because if the tapped density is too large, the diffusion of lithium ions through the nonaqueous electrolyte in the positive electrode active material layer may serve as the rate-limiting step, resulting in reduction in load characteristics.

The tapped density of the positive electrode active material can be measured as follows. A sample is dropped through a sieve with a mesh of 300 μm into a tapping cell (20 $cm^3$). After the cell capacity is filled with the sample, the cell is tapped 1,000 times at a stroke of 10 mm with a powder density measuring device (e.g., Tap Denser available from Seishin Enterprise Co., Ltd.). The density is calculated from the volume and the weight of the sample after the tapping and defined as the tapped density.

The positive electrode active material particles typically have a median size d50 (if secondary particles are formed of agglomerated primary particles, a secondary particle size) of 0.1 μm or larger, preferably 0.5 μm or larger, more preferably 1 μm or larger, and most preferably 3 μm or larger, and typically 20 μm or smaller, preferably 18 μm or smaller, more preferably 16 μm or smaller, and most preferably 15 μm or smaller. If the median size d50 (secondary particle size) is smaller than the lower limit, a product with high bulk density may not be obtained. If the median size d50 (secondary particle size) is larger than the upper limit, diffusion of lithium in the particles takes much time, which may decrease cell performances. In addition, when the cell positive electrode is prepared, that is, when a slurry prepared by mixing the positive electrode active material, a conductive aid, a binder, and the like is applied to form a thin film, a streak may disadvantageously be formed on the film. Two or more of positive electrode active materials having different median sizes d50 may be mixed to further improve the packing performance in producing the positive electrode.

The median size d50 herein can be measured with a known laser diffraction/scattering particle size distribution measurement apparatus. If LA-920 available from HORIBA. Ltd. is used as the particle size distribution measurement apparatus, the median size is measured using a 0.1% by mass sodium hexamethaphosphate aqueous solution as a dispersion medium at a measurement refraction index of 1.24 after ultrasonic dispersion for five minutes.

If the positive electrode material includes secondary particles formed of agglomerated primary particles, the positive electrode active material typically has an average primary particle size of 0.01 μm or larger, preferably 0.05 μm or larger, even more preferably 0.08 μm or larger, and most preferably 0.1 μm or lager, and typically 3 μm or smaller, preferably 2 μm or smaller, even more preferably 1 μm or smaller, and most preferably 0.6 μm or smaller. If the average primary particle size is larger than the upper limit, spherical secondary particles are less likely to be formed, which adversely affects the powder packing performance and significantly decreases the specific surface area. This may increase the possibility of lowering cell performances such as output performance. If the average particle size is smaller than the lower limit, the crystals are generally not fully developed and therefore may cause problems such as poor charge and discharge reversibility. The primary particle size can be measured by observation using a scanning electron microscope (SEM). Specifically, in a picture at 10000-times magnification, the maximum section length of a primary particle in a horizontal direction was measured for arbitrary 50 primary particles, and the average of the measured values was determined as the primary particle size.

The positive electrode active material has a BET specific surface area of 0.2 $m^2/g$ or greater, preferably 0.3 $m^2/g$ or greater, and even more preferably 0.4 $m^2/g$ or greater, and 4.0 $m^2/g$ or smaller, preferably 2.5 $m^2/g$ or smaller, and even more preferably 1.5 $m^2/g$ or smaller. If the BET specific surface area is smaller than the range, cell performances are more likely to lower. If the BET specific surface area is larger than the range, the tapped density is less likely to increase, which may cause problems with application properties in production of the positive electrode active material.

The BET specific surface area herein is defined as the value measured with a surface area meter (e.g., a fully automatic surface area analyzer available from Ohkura Riken Co., Ltd.). Specifically, a sample is preliminary dried under a stream of nitrogen at 150° C. for 30 minutes and then subjected to a measurement by a nitrogen adsorption single point BET method employing a flowing gas method using nitrogen/helium mixed gas that is accurately adjusted so that the relative pressure of nitrogen to the atmospheric pressure should be 0.3.

The positive electrode active material can be produced by any common method for producing an inorganic compound. In particular, a spherical or elliptical spherical active material can be produced by various methods such as a method including dissolving or milling-dispersing a transition metal material such as a nitrate or sulfate of transition metal and optionally material(s) of other element(s) in a solvent such as water, adjusting the pH under stirring to form a spherical precursor, collecting the precursor and optionally drying it, and then adding an Li source (e.g., LiOH, $Li_2CO_3$, $LiNO_3$) to the dried precursor, followed by firing at a high temperature to prepare an active material; a method including dissolving or milling-dispersing a transition metal material such as a nitrate, a sulfate, a hydroxide, or an oxide of transition metal and optionally material(s) of other element(s) in a solvent such as water, drying and molding the obtained solution (dispersion) by a spray dryer or the like to prepare a spherical or elliptical spherical precursor, and then adding an Li source (e.g., LiOH, $Li_2CO_3$, $LiNO_3$) to the precursor, followed by firing at high temperature to prepare an active material; and a method including dissolving or milling-dispersing a transition metal material such as a nitrate, a sulfate, a hydroxide, or an oxide of transition metal and an Li source (e.g., LiOH, $Li_2CO_3$, $LiNO_3$) and optionally material(s) of other element(s) in a solvent such as water, drying and molding the obtained solution (dispersion) by a spray dryer or the like to prepare a spherical or elliptical spherical precursor, and firing the precursor at a high temperature to prepare an active material.

Each of the positive electrode active materials may be used alone. Alternatively, two or more positive electrode active materials having different compositions or different particle properties may be used in any combination at any ratio.

The negative electrode active material is not particularly limited as long as it can electrochemically absorb/release a lithium ion, and may be a carbonaceous material, a metal oxide such as tin oxide or silicon oxide, a metal complex oxide, elemental lithium, a lithium alloy such as lithium aluminum alloy, a metal capable of forming an alloy with lithium such as Sn or Si, or the like. These may be used alone, or two or more of these materials can be used in any combination at any ratio. Preferred among these are carbonaceous materials and lithium complex oxides from the viewpoint of safety.

The metal complex oxide is not particularly limited as long as it can absorb/release lithium. The metal complex oxide preferably contains titanium and/or lithium as a component from the viewpoint of charge and discharge characteristics at high current density.

In terms of the balance between the initial irreversible capacity, and high current density charge/discharge characteristics, the carbonaceous material is preferably selected from the following materials (1) to (4):

(1) natural graphite,
(2) artificial carbonaceous materials and artificial graphite materials; carbonaceous materials resulting from at least one cycle of heating treatment at 400° C. to 3200° C. performed on carbonaceous substances {e.g., natural graphite, coal coke, petroleum coke, coal pitch, petroleum pitch, and oxides of the above pitches; needle coke, pitch coke, and partially graphitized carbon materials of the above cokes; pyrolysates of organic materials such as furnace black, acetylene black, and pitch carbon fiber; carbonizable organic materials (e.g., coal tar pitches from soft pitch to hard pitch; petroleum heavy oils such as retort oil; DC heavy oils such as atmospheric residue and vacuum residual oil; cracked petroleum heavy oils such as ethylene tar that is a byproduct generated in pyrolysis of crude oil, naphtha, and the like; aromatic hydrocarbons such as acenaphthylene, decacyclene, anthracene, and phenanthrene; N-cyclic compounds such as phenazine and acridine; S-cyclic compounds such as thiophene and bithiophene; polyphenylenes such as biphenyl and terphenyl; polyvinyl chloride, polyvinyl alcohol, polyvinyl butyral, and insolubilized materials of these; nitrogen-containing organic polymers such as polyacnilonitrile and polypyrrole; sulfur-containing organic polymers such as polythiophene and polystyrene; natural polymers such as polysaccharides typified by cellulose, lignin, mannan, polygalacturonic acid, chitosan, and saccharose; thermoplastic resins such as polyphenylene sulfide and polyphenylene oxide; thermosetting resins such as furfuryl alcohol resin, phenol-formaldehyde resin, and imide resin) and carbides of these; and solutions containing the carbonizable organic materials dissolved in low-molecular-weight organic solvents such as benzene, toluene, xylene, quinoline, and n-hexane, and carbides of these};

(3) carbonaceous materials in which the negative electrode active material layer contains at least two kinds of carbon materials having different crystallizability and/or has an interface where the carbon materials having different crystallizability are in contact; and (4) carbonaceous materials in which the negative electrode active material layer contains at least two kinds of carbon materials having different orientation characteristics and/or has an interface where the carbon materials having different orientation characteristics are in contact.

The negative electrode active material may be a powdered carbonaceous material such as ones obtainable by firing and carbonizing graphite, activated coal, phenol resin, pitch, or the like. Alternatively, the negative electrode active material may be a metal oxide such as GeO, $GeO_2$, SnO, $SnO_2$, PbO, or $PbO_2$, or a complex metal oxide thereof (e.g., those disclosed in JP H07-249409 A).

The material for forming an electric double layer capacitor may be a carbonaceous material such as activated coal, carbon black, graphite, expanded graphite, porous carbon, carbon nanotube, carbon nanohorn, or ketjen black.

Examples of the activated coal include phenol resin-based activated coal, coconut shell-based activated coal, and petroleum coke-based activated coal.

The conductive aid is optionally added to improve the electrical conductivity if the cell is formed using an electrode material with a low electron conductivity (e.g., $LiCoO_2$). Examples of the conductive aid include carbonaceous substances such as carbon blacks (e.g., acetylene black, ketjen black), fine graphite powder, carbon fiber, fibrous carbon, carbon fiber, and carbon nanohorn, and fine powders and fibers of metals such as nickel and aluminum.

The amount of the powdery electrode material is preferably 40% by mass or more in the electrode mixture in order to increase the capacity of the resultant electrode.

The electrode mixture of the present invention may be prepared by, for example, a method including dissolving a binder in an organic solvent to prepare a solution, dispersing a powdery electrode material in the solution, and mixing them. Alternatively, the electrode mixture may be prepared by a method including preliminarily mixing binder powder with a powdery electrode material, followed by adding an organic solvent to the mixed powder.

The electrode mixture of the present invention includes a specific binder and a specific organic solvent as described above, and therefore shows little decrease in viscosity even if the mixture is left to stand for a long period of time after preparation of the mixture and enables production of an electrode having a high electrode density and excellent flexibility.

Examples of the method of producing an electrode using the electrode mixture of the invention include a method in which the electrode mixture of the present invention is applied to a collector, and then dried, and pressed to form a thin electrode mixture layer, so that an electrode in the form of a thin film is produced.

The collector may be metallic foil or metallic mesh of iron, stainless steel, copper, aluminum, nickel, titanium, or the like metal.

The electrode mixture of the present invention can be used in a nonaqueous electrolyte secondary cell.

The nonaqueous electrolyte secondary cell includes a positive electrode including a positive electrode mixture retained by a positive electrode collector, a negative electrode including a negative electrode mixture retained by a negative electrode collector, and a nonaqueous electrolyte.

The positive electrode mixture preferably includes the above-described powdery electrode material, binder, and organic solvent. The powdery electrode material preferably includes the above positive electrode active material and the conductive aid.

The negative electrode mixture preferably includes the above-described powdery electrode material, binder, and organic solvent. The powdery electrode material is preferably a negative electrode active material.

The positive electrode collector may be, for example, aluminum foil. The negative electrode collector may be, for example, copper foil.

The nonaqueous electrolyte is not particularly limited. The organic solvent may be one or two or more known solvents such as propylene carbonate, ethylene carbonate, butylene carbonate, γ-butyrolactone, 1,2-dimethoxyethane, 1,2-diethoxyethane, dimethyl carbonate, diethyl carbonate, and ethyl methyl carbonate. The electrolyte may be any conventionally known one, and may be $LiClO_4$, $LiAsF_6$, $LiPF_6$, $LiBF_4$, LiCl, LiBr, $CH_3SO_3Li$, $CF_3SO_3Li$, cesium carbonate, or the like.

The electrode mixture typically has a weight ratio of the powdery electrode material to the binder of about 80:20 to 99.9:0.1. This weight ratio is determined in consideration of retention of the powder components, adhesion to the collector, and electrical conductivity of the electrode.

With the above composition ratio, the binder does not completely fill the gap between the powder components on the electrode mixture layer formed on the collector. However, if a solvent which can well dissolve the binder therein is used, the binder can be uniformly dispersed to form a net structure in the dried electrode mixture layer, thereby well retaining the powder components. Thus, it is preferred to use such a solvent.

The amount of the organic solvent in the electrode mixture is determined in consideration of application properties to the collector and thin film formation properties after drying. The weight ratio of the binder to the organic solvent is typically preferably 5:95 to 20:80.

The binder used preferably has an average particle size as small as 1,000 µm or smaller, and especially preferably 50 to 350 µm, in order to rapidly dissolve the binder in the organic solvent.

The electrode mixture of the present invention, which is intended to be used in a nonaqueous electrolyte secondary cell, can be used not only in the above-described lithium ion secondary cell with a liquid electrolyte, but also in a polymer electrolyte lithium secondary cell. In addition, the electrode mixture can be used for an electrical double layer capacitor.

Advantageous Effects of Invention

The electrode mixture of the present invention having the above configuration shows little change in viscosity even after 24 hours from the preparation of the mixture and enables production of an electrode having a high electrode density and excellent flexibility. The electrode mixture of the present invention can be extremely suitably used as an electrode mixture for a nonaqueous electrolyte secondary cell such as a lithium ion secondary cell.

DESCRIPTION OF EMBODIMENTS

The present invention is described with reference to examples in more detail. The examples are not intended to limit the scope of the invention.

Preparation Example 1

Preparation of Fluorine-Containing Polymer A

A 6-L autoclave was charged with pure water (1.9 kg), followed by sufficient purging with nitrogen. Subsequently, octafluorocyclobutane (1.8 kg) was charged and the system was maintained at 37° C. at a stirring rate of 580 rpm.

Thereafter, mixed gas (260 g) having a TFE/VdF ratio of 5/95 (mol %) and ethyl acetate (0.6 g) were charged to the autoclave, and then a 50% by mass solution (2.8 g) of di-n-propyl peroxydicarbonate in methanol was added to start polymerization. Since the pressure in the system decreased with progression of the polymerization, mixed gas having a TFE/VdF ratio of 5/85 (mol %) was continuously supplied to maintain the pressure in the system at 1.3 MPaG. Stirring was continued for 32 hours. Thereafter, the pressure was released to the atmospheric pressure, and then the reaction product was washed and dried. Thereby, white powder (900 g) of a fluorine-containing polymer A was obtained.

The fluorine-containing polymer A had the composition and properties below.

VdF/TFE=83.0/17.0(mol %)

5 wt % NMP solution viscosity: 440 mPa·s (25° C.)
Number average molecular weight: 270,000
Weight average molecular weight: 870,000
Tensile modulus: 450 MPa Preparation Example 2

Preparation of Fluorine-Containing Polymer B

A 4-L autoclave was charged with pure water (1.3 kg), followed by sufficient purging with nitrogen. Subsequently, octafluorocyclobutane (1.3 kg) was charged and the system was maintained at 37° C. at a stirring rate of 580 rpm.

Thereafter, mixed gas (200 g) having a TFE/VdF ratio of 4/96 (mol %) and ethyl acetate (0.4 g) were charged to the autoclave, and then a 50% by mass solution (1 g) of di-n-propyl peroxydicarbonate in methanol was added to start polymerization. Since the pressure in the system decreased with progression of the polymerization, mixed gas having a TFE/VdF ratio of 13/87 (mol %) was continuously supplied to maintain the pressure in the system at 1.3 MPaG. Stirring was continued for 17 hours. Thereafter, the pressure was released to the atmospheric pressure, and then the reaction product was washed and dried. Thereby, white powder (190 g) of a fluorine-containing polymer B was obtained.

The fluorine-containing polymer B had the composition and properties below.

VdF/TFE=86.6/13.4(mol %)

Number average molecular weight: 274,000
Weight average molecular weight: 768,000
Tensile modulus: 500 MPa Preparation Example 3

Preparation of Fluorine-Containing Polymer C

A 4-L autoclave was charged with pure water (1.3 kg), followed by sufficient purging with nitrogen. Subsequently, octafluorocyclobutane (1.3 kg) was charged and the system was maintained at 37° C. at a stirring rate of 580 rpm.

Thereafter, mixed gas (200 g) having a TFE/VdF ratio of 3/97 (mol %) and ethyl acetate (0.4 g) were charged to the autoclave, and then a 50% by mass solution (1 g) of di-n-propyl peroxydicarbonate in methanol was added to start polymerization. Since the pressure in the system decreased with progression of the polymerization, mixed gas having a TFE/VdF ratio of 11/89 (mol %) was continuously supplied to maintain the pressure in the system at 1.3 MPaG. Stirring was continued for 20 hours. Thereafter, the pressure was released to the atmospheric pressure, and then the reaction product was washed and dried. Thereby, white powder (190 g) of a fluorine-containing polymer C was obtained.

The fluorine-containing polymer C had the composition and properties below.

VdF/TFE=88.8/11.2(mol %)

Number average molecular weight: 305,000
Weight average molecular weight: 854,000
Tensile modulus: 550 MPa Preparation Example 4

Preparation of Fluorine-Containing Polymer D

A 4-L autoclave was charged with pure water (1.3 kg), followed by sufficient purging with nitrogen. Subsequently, octafluorocyclobutane (1.3 kg) was charged and the system was maintained at 37° C. at a stirring rate of 580 rpm.

Thereafter, mixed gas (200 g) having a TFE/VdF ratio of 6/94 (mol %) and ethyl acetate (0.4 g) were charged to the autoclave, and then a 50% by mass solution (1 g) of di-n-propyl peroxydicarbonate in methanol was added to start polymerization. Since the pressure in the system decreased with progression of the polymerization, mixed gas having a TFE/VdF ratio of 19/81 (mol %) was continuously supplied to maintain the pressure in the system at 1.3 MPaG. Stirring was continued for 11 hours. Thereafter, the pressure was released to the atmospheric pressure, and then the reaction product was washed and dried. Thereby, white powder (130 g) of a fluorine-containing polymer D was obtained.

The fluorine-containing polymer D had the composition and properties below.

VdF/TFE=81.0/19.0(mol %)

Number average molecular weight: 283,000

Weight average molecular weight: 795,000

Tensile modulus: 400 MPa

Preparation Example 5

Preparation of Fluorine-Containing Polymer E

A 6-L autoclave was charged with pure water (1.9 kg), followed by sufficient purging with nitrogen. Subsequently, octafluorocyclobutane (1.8 kg) was charged and the system was maintained at 37° C. at a stirring rate of 580 rpm.

Thereafter, mixed gas (260 g) having a TFE/VdF ratio of 6/94 (mol %) and ethyl acetate (0.6 g) were charged to the autoclave, and then a 50% by mass solution (2.8 g) of di-n-propyl peroxydicarbonate in methanol was added to start polymerization. Since the pressure in the system decreased with progression of the polymerization, mixed gas having a TFE/VdF ratio of 5/85 (mol %) was continuously supplied to maintain the pressure in the system at 1.3 MPaG. Stirring was continued for 32 hours. Thereafter, the pressure was released to the atmospheric pressure, and then the reaction product was washed and dried. Thereby, white powder (900 g) of a fluorine-containing polymer E was obtained.

The fluorine-containing polymer E had the composition and properties below.

VdF/TFE=80.0/20.0(mol %)

5 wt % NMP solution viscosity: 410 mPa·s (25° C.)

Number average molecular weight: 230,000

Weight average molecular weight: 820,000

Tensile modulus: 420 MPa

Preparation Example 6

Preparation of Fluorine-Containing Polymer F

A 4-L autoclave was charged with pure water (1.3 kg), followed by sufficient purging with nitrogen. Subsequently, octafluorocyclobutane (1.3 kg) was charged and the system was maintained at 37° C. at a stirring rate of 580 rpm.

Thereafter, mixed gas (200 g) having a TFE/VdF ratio of 7/93 (mol %) and ethyl acetate (0.4 g) were charged to the autoclave, and then a 50% by mass solution (1 g) of di-n-propyl peroxydicarbonate in methanol was added to start polymerization. Since the pressure in the system decreased with progression of the polymerization, mixed gas having a TFE/VdF ratio of 22/78 (mol %) was continuously supplied to maintain the pressure in the system at 1.3 MPaG. Stirring was continued for 6 hours. Thereafter, the pressure was released to the atmospheric pressure, and then the reaction product was washed and dried. Thereby, white powder (60 g) of a fluorine-containing polymer F was obtained.

The fluorine-containing polymer F had the composition and properties below.

VdF/TFE=78.0/22.0(mol %)

Number average molecular weight: 265,000

Weight average molecular weight: 750,000

Tensile modulus: 400 MPa

Preparation Example 7

Preparation of Fluorine-Containing Polymer G

A 4-L autoclave was charged with pure water (1.3 kg), followed by sufficient purging with nitrogen. Subsequently, octafluorocyclobutane (1.3 kg) was charged and the system was maintained at 37° C. at a stirring rate of 580 rpm.

Thereafter, mixed gas (200 g) having a TFE/VdF ratio of 2/98 (mol %) and ethyl acetate (1 g) were charged to the autoclave, and then a 50% by mass solution (1 g) of di-n-propyl peroxydicarbonate in methanol was added to start polymerization. Since the pressure in the system decreased with progression of the polymerization, mixed gas having a TFE/VdF ratio of 8/92 (mol %) was continuously supplied to maintain the pressure in the system at 1.3 MPaG. Stirring was continued for 20 hours. Thereafter, the pressure was released to the atmospheric pressure, and then the reaction product was washed and dried. Thereby, white powder (130 g) of a fluorine-containing polymer G was obtained.

The fluorine-containing polymer G had the composition and properties below.

VdF/TFE=91.5/8.5(mol %)

Number average molecular weight: 296,000

Weight average molecular weight: 799,000

Tensile modulus: 980 MPa

Preparation Example 8

Preparation of Fluorine-Containing Polymer H

A 4-L autoclave was charged with pure water (1.3 kg), followed by sufficient purging with nitrogen. Subsequently, octafluorocyclobutane (0.88 kg) was charged and the system was maintained at 37° C. at a stirring rate of 555 rpm.

Thereafter, mixed gas (150 g) having a TFE/VdF ratio of 5/95 (mol %) was charged to the autoclave, and then a 50% by mass solution (1.5 g) of di-n-propyl peroxydicarbonate in methanol was added to start polymerization. Since the pressure in the system decreased with progression of the polymerization, mixed gas having a TFE/VdF ratio of 15/85 (mol %) was continuously supplied to maintain the pressure in the system at 1.3 MPaG. Stirring was continued for 44 hours. Thereafter, the pressure was released to the atmospheric pressure, and then the reaction product was washed and dried. Thereby, white powder (600 g) of a fluorine-containing polymer H was obtained.

The fluorine-containing polymer H had the composition and properties below.

VdF/TFE=82.9/17.1(mol %)

Number average molecular weight: 300,000
Weight average molecular weight: 1,210,000
Tensile modulus: 450 MPa The following polyvinylidene fluorides (PVdF) (a) to (g) were prepared.
(PVdF (a))
KF7200 (PVdF, available from Kureha Chemical Industry Co., Ltd.) was used.

VdF=100 mol %

Number average molecular weight: 295,000
Weight average molecular weight: 835,000
Tensile modulus: 1,200 MPa
(PVdF (b))
HSV900 (PVdF, available from Arkema Inc.) was used.

VdF=100 mol %

Number average molecular weight: 270,000
Weight average molecular weight: 780,000
Tensile modulus: 1,100 MPa
(PVdF (c))
KF9200 (PVdF, available from Kureha Chemical Industry Co., Ltd.) was used.

VdF/monomethyl maleate=99.8/0.2 mol %

Number average molecular weight: 203,000
Weight average molecular weight: 650,000
Tensile modulus: 1,200 MPa
(PVdF (d))
KF1100 (PVdF, available from Kureha Chemical Industry Co., Ltd.) was used.

VdF=100 mol %

Number average molecular weight: 120,000
Weight average molecular weight: 270,000
Tensile modulus: 1,200 MPa
(PVdF (e))

VdF=100 mol %

Number average molecular weight: 265,000
Weight average molecular weight: 747,000
Tensile modulus: 1,200 MPa
(PVdF (f))

VdF=100 mol %

Number average molecular weight: 320,000
Weight average molecular weight: 852,000
Tensile modulus: 1,200 MPa
(PVdF (g))

VdF=100 mol %

Number average molecular weight: 336,000
Weight average molecular weight: 1,020,000
Tensile modulus: 1,200 MPa The compositions, molecular weights, and tensile moduluses of the fluorine-containing polymers and PVdFs were determined by the following methods.
<Polymer Composition>

Solutions of the polymers in DMSO were prepared and each subjected to $^{19}$F-NMR measurement using an NMR analyzing device (VNS400 MHz available from Agilent Technologies, Inc.).

The following peak areas (A, B, C, and D) were measured by the $^{19}$F-NMR measurement, and the ratio of VdF to TFE was calculated.
A: the area of the peak from −86 ppm to −98 ppm
B: the area of the peak from −105 ppm to −118 ppm
C: the area of the peak from −119 ppm to −122 ppm
D: the area of the peak from −122 ppm to −126 ppm VdF: $(4A+2B)/(4A+3B+2C+2D)\times100$[mol %]

TFE: $(B+2C+2D)/(4A+3B+2C+2D)\times100$[mol %]

<Number Average Molecular Weight and Weight Average Molecular Weight>

The number average molecular weight and weight average molecular weight were calculated from the data (reference: polystyrene) obtained by gel permeation chromatography (GPC) using HLC-8320GPC available from Tosoh Corporation, columns (three pieces of Super AWM-H connected in series), and dimethylformamide (DMF) as a solvent.
<Tensile Modulus>

A 5% by mass solution of each fluorine-containing polymer in N-methyl-2-pyrolidone (NMP) was prepared and cast-coated to aluminum foil. Thereafter, the coating was dried with an air-blowing constant-temperature thermostat (Yamato Scientific Co., Ltd.) at 120° C., thereby completely evaporating NMP. This provided a strip-shaped cast film having a thickness of 10 μm.

The obtained cast film of the fluorine-containing polymer was peeled from the aluminum foil. An ASTM V type dumbbell was then stamped out of the film, and the tensile modulus was measured with the dumbbell and a tensilon in accordance with ASTM D-638 (1999).

Examples 1 to 16, Comparative Examples 1 to 7

Preparation of Positive Electrode Mixture

LiCoO$_2$ (available from Nippon Chemical Industrial Co., Ltd.), a binder, and acetylene black (available from DENKI KAGAKU KOGYO K.K.) were weighed such that the mass ratio of LiCoO$_2$:binder:acetylene black was 100:1:1.

The binder used was a mixture of a fluorine-containing polymer and PVdF at the mass ratio shown in Table 1.

The binder was dissolved in N-methyl-2-pyrolidone (NMP) to a concentration of 5% by mass. The obtained NMP solution was mixed with predetermined amounts of LiCoO$_2$ and acetylene black. The mixture was stirred at 100 rpm for 60 minutes with a stirrer (T.K.HIVIS MIX available from PRIMIX Corporation), and then additionally stirred at 100 rpm for 30 minutes while a vacuum deaeration treatment was performed. The stirred NMP solution was filtered through a Ni mesh (200 mesh) to achieve uniformity of the particle size of the solid components. Thereby, a positive electrode mixture was obtained.

The viscosity of the obtained positive electrode mixture was measured to estimate the stability by the following method. The results are shown in Table 1.
<Stability (Viscosity Retention (%))>

The viscosity of the obtained positive electrode mixture was measured with a rheometer (a stress controlled rheometer Discovery HR-1 available from TA Instrument).

The viscosity (η0) right after the preparation of the mixture and the viscosity (ηa) 24 hours after the preparation of the mixture were measured, and the viscosity retention (Xa) was calculated in accordance with the equation below. The viscosity of the mixture herein means a viscosity value at a shear rate of 100 sec$^{-1}$ in the measurement using a cone and plate geometry (diameter: 40 mm, cone angle: 1°) at 25° C. while the shear rate was swept from 0.01 sec$^{-1}$ to 1000 sec$^{-1}$.

$Xa=\eta a/\eta 0\times100$[%]

TABLE 1

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Binder | PVdF | a | 70 | — | 70 | 70 | 70 | 70 | 30 | 80 | 50 | — |
|  |  | b | — | — | — | — | — | — | — | — | — | 50 |
|  |  | c | — | 70 | — | — | — | — | — | — | — | — |
|  |  | d | — | — | — | — | — | — | — | — | — | — |
|  | Fluorine- | A | — | — | — | 30 | — | — | 70 | 20 | 50 | 50 |
|  | containing | B | 30 | 30 | — | — | — | — | — | — | — | — |
|  | polymer | C | — | — | 30 | — | — | — | — | — | — | — |
|  |  | D | — | — | — | — | 30 | — | — | — | — | — |
|  |  | E | — | — | — | — | — | 30 | — | — | — | — |
|  |  | F | — | — | — | — | — | — | — | — | — | — |
|  |  | G | — | — | — | — | — | — | — | — | — | — |
| Viscosity of electrode mixture |  |  |  |  |  |  |  |  |  |  |  |  |
| ($\eta 0$) Right after preparation of the mixture [Pa · s] |  |  | 4.28 | 4.23 | 4.61 | 4.26 | 4.18 | 4.25 | 4.13 | 4.28 | 4.16 | 4.45 |
| ($\eta b$) 24 hours after preparation [Pa · s] |  |  | 3.51 | 3.55 | 3.91 | 3.62 | 2.92 | 2.98 | 3.39 | 3.68 | 3.41 | 3.65 |
| (Xb) Viscosity retention (after 24 hours) [%] |  |  | 82 | 84 | 85 | 85 | 80 | 77 | 82 | 86 | 82 | 82 |

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Binder | PVdF | a | 70 | 70 | — | — | — | — |
|  |  | b | — | — | — | — | — | — |
|  |  | c | — | — | — | — | — | — |
|  |  | d | — | — | 70 | 30 | 30 | 30 |
|  | Fluorine- | A | — | — | 30 | 70 | — | — |
|  | containing | B | — | — | — | — | — | — |
|  | polymer | C | — | — | — | — | — | — |
|  |  | D | — | — | — | — | 70 | — |
|  |  | E | — | — | — | — | — | 70 |
|  |  | F | 30 | — | — | — | — | — |
|  |  | G | — | 30 | — | — | — | — |
| Viscosity of electrode mixture |  |  |  |  |  |  |  |  |
| ($\eta 0$) Right after preparation of the mixture [Pa · s] |  |  | 4.15 | 4.36 | 1.82 | 3.63 | 3.59 | 3.42 |
| ($\eta b$) 24 hours after preparation [Pa · s] |  |  | 2.74 | 3.62 | 1.56 | 2.98 | 2.55 | 2.39 |
| (Xb) Viscosity retention (after 24 hours) [%] |  |  | 66 | 85 | 86 | 82 | 71 | 70 |

|  |  |  | Example 11 | Example 12 | Example 13 | Example 14 | Example 15 | Example 16 | Comparative Example 7 |
|---|---|---|---|---|---|---|---|---|---|
| Binder | PVdF | d | — | — | — | — | — | — | 80 |
|  |  | e | 80 | — | — | 80 | — | — | — |
|  |  | f | — | 80 | — | — | 80 | — | — |
|  |  | g | — | — | 80 | — | — | 80 | — |
|  | Flourine- | A | 20 | 20 | 20 | — | — | — | 20 |
|  | containing | H | — | — | — | 20 | 20 | 20 | — |
|  | polymer |  |  |  |  |  |  |  |  |
| Viscosity of electrode mixture |  |  |  |  |  |  |  |  |  |
| ($\eta 0$) Right after preparation of the mixture [Pa · s] |  |  | 4.09 | 4.22 | 4.30 | 4.20 | 4.29 | 4.42 | 2.02 |
| ($\eta b$) 24 hours after preparation [Pa · s] |  |  | 3.48 | 3.58 | 3.70 | 3.57 | 3.64 | 3.80 | 1.7 |
| (Xb) Viscosity retention (after 24 hours) [%] |  |  | 85 | 85 | 86 | 85 | 85 | 86 | 84 |

(Preparation of Positive Electrode)

Each of the positive electrode mixtures prepared in Examples 3 to 16 and Comparative Examples 3 to 7 was left to stand for 24 hours following the preparation. Thereafter, the mixture was applied to Al foil (thickness: 22 μm, available from TOYO ALUMINUM K.K.) as a collector with an applicator in such an amount that the positive electrode coating should have a dry mass of 16 to 17 mg/cm². After the application, the coating was dried with an air-blowing constant-temperature thermostat (Yamato Scientific Co., Ltd.) at 120° C., thereby completely evaporating NMP. Thus, a positive electrode was prepared.

The positive electrode was subjected to the following evaluations. The results are shown in Table 2.

<Electrode Density>

The positive electrode was passed through a roll press machine (gap: 0 μm, pressure: 4 t) at room temperature, and the area, the thickness, and the weight of the positive electrode were measured to calculate the electrode density (g/cm³).

<Flexibility (Folding Test of Positive Electrode)>

The prepared positive electrode was cut to a size of 3 cm long×6 cm wide. The electrode was folded 180° and then unfolded. The presence or absence of cracks on the positive electrode was visually checked. If no crack was observed, the positive electrode was evaluated as "o." If a crack was observed, the positive electrode was evaluated as "x."

<Electrode Adhesion (90 Degree Peel Test at Interface Between Electrode and Collector Interface)>

The positive electrode was cut to a size of 1.2×8.0 cm. The electrode side of the positive electrode was fixed to a movable jig, and a piece of tape was applied to the collector side. The tape was pulled at 90° at a speed of 100 mm/min, and a stress (N/mm) caused by the pulling of the tape was measured with an autograph. The autograph was equipped with a 1 N load cell.

(Preparation of Negative Electrode)

Styrene-butadiene rubber and carboxymethyl cellulose were dispersed in distilled water. Synthetic graphite powder (available from Hitachi Chemical Co., Ltd. under the trade name of MAG-D) was added to the dispersions such that the solid contents in the obtained mixtures were each 1.2% by mass. The obtained mixture was mixed with a disperser to produce a slurry-like mixture. The mixture was uniformly applied to a negative electrode collector (copper foil having a thickness of 10 μm), and the coating was dried to form a negative electrode mixture layer, followed by compression-molding with a roller press machine. Thereby, a negative electrode was prepared.

(Preparation of Coin Cell)

A circular shape (diameter: 13 mm) was stamped out of each of a lithium metal and the positive electrode obtained above with a punching machine. A micro-porous polypropylene film was interposed between this circular positive electrode and the negative electrode obtained above, and then a nonaqueous electrolyte is poured to provide a coin cell. The nonaqueous electrolyte used was prepared by dissolving $LiPF_6$ at a concentration of 1 mol/L in a mixed solvent of ethylene carbonate and ethyl methyl carbonate in a volume ratio of 3/7.

(Preparation of Laminate Cell)

A strip-shaped positive electrode was cut to a size of 40 mm×72 mm (with a 10 mm×10 mm positive electrode terminal) and a strip-shaped negative electrode was cut to a size of 42 mm×74 mm (with a 10 mm×10 mm negative electrode terminal). A lead was welded to each of the terminals. A 20-μm-thick polypropylene film separator was cut into a size of 78 mm×46 mm to prepare a separator. The separator was disposed between the positive electrode and the negative electrode. The resulting assembly was put in an aluminum laminated casing. Subsequently, 2 ml of an electrolyte was put into the casing, and the casing was sealed, whereby a laminated cell having a capacity of 72 mAh was produced. The electrolyte used was prepared by dissolving $LiPF_6$ at a concentration of 1 mol/L in a mixed solvent of ethylene carbonate and ethyl methyl carbonate in a volume ratio of 3/7.

<Initial Discharge Capacity of Positive Electrode>

The prepared coin cell was charged at a temperature of 25° C. at a constant current of 0.2 C until the voltage reached 4.2 V, and then discharged at a constant current of 0.2 C until the voltage reached 3.0 V. Thereby, the initial discharge capacity (mAh/g) of the positive electrode was determined.

<Initial Internal Resistance>

The prepared coin cell was charged at a constant current (0.2 C)-constant voltage (4.2 V) and then discharged at 0.2 C to a discharge cut-off voltage of 3.0 V, at a temperature of 25° C. This charge and discharge cycle was repeated three times. Thereafter, the cell with a state of charge (SOC) of 100% was allowed to discharge at 0.5 C, 1 C, 2 C, or 5 C, and a decrease in voltage (decrease in voltage at 15 seconds from the start of discharging) at each discharge current was measured. The initial internal resistance (0) was calculated from the current values and the decreases in voltage.

<Cycle Characteristics>

The cycle characteristics were measured using the prepared laminate cell as follows. A charge and discharge cycle under the charge and discharge conditions (charged at 1.0 C and 4.2 V until the charge current reached 1/10 C, and discharged at a current corresponding to 1 C until the voltage reached 3.0 V) was regarded as 1 cycle. The discharge capacity was measured after the first cycle and after 300 cycles. With regard to the cycle characteristics, the value calculated by the following equation is regarded as cycle retention.

Cycle retention (%)=300 cycle discharge capacity (mAh)/1 cycle discharge capacity(mAh)×100

<Cycle Characteristics at High Temperature>

The cycle characteristics were measured as follows using the prepared laminate cell. A charge and discharge cycle under the charge and discharge conditions (in a constant-temperature bath at 55° C., charged at 1.0 C at 4.2 V until the charge current reached 1/10 C, and discharged at a current corresponding to 1 C until the voltage reached 3.0 V) was regarded as 1 cycle. The discharge capacity was measured after the first cycle and after 200 cycles. With regard to the cycle characteristics, the value calculated by the following equation is regarded as a cycle retention.

Cycle retention (%)=200 cycle discharge capacity (mAh)/1 cycle discharge capacity(mAh)×100

TABLE 2

| | | | Example 3 | Example 4 | Example 5 | Example 6 | Example 7 | Example 8 | Example 9 |
|---|---|---|---|---|---|---|---|---|---|
| Binder | PVdF | a | 70 | 70 | 70 | 70 | 30 | 80 | 50 |
| | | b | — | — | — | — | — | — | — |
| | | c | — | — | — | — | — | — | — |
| | | d | — | — | — | — | — | — | — |
| | Fluorine-containing polymer | A | — | 30 | — | — | 70 | 20 | 50 |
| | | B | — | — | — | — | — | — | — |
| | | C | 30 | — | — | — | — | — | — |
| | | D | — | — | 30 | — | — | — | — |
| | | E | — | — | — | 30 | — | — | — |
| | | F | — | — | — | — | — | — | — |
| | | G | — | — | — | — | — | — | — |
| Electrode density (g/cm³) | | | 3.5 | 3.5 | 3.5 | 3.5 | 3.5 | 3.5 | 3.5 |
| Flexibility | | | ○ | ○ | ○ | ○ | ○ | ○ | ○ |
| Electrode adhesion | | | 0.13 | 0.13 | 0.09 | 0.08 | 0.08 | 0.14 | 0.09 |

TABLE 2-continued

| Cell characteristics evaluation | (N/mm) Initial discharge capacity (mAh/g) | 142 | 143 | 142 | 142 | 144 | 143 | 144 |
|---|---|---|---|---|---|---|---|---|
| | Initial internal resistance (DC)(Ω) | 1.47 | 1.46 | 1.46 | 1.47 | 1.36 | 1.48 | 1.35 |
| | Cycle retention (%) | 87 | 88 | 81 | 77 | 88 | 90 | 88 |

| | | | Example 10 | Comparative Example 3 | Comparative Example 4 | Comparative Example 5 | Comparative Example 6 |
|---|---|---|---|---|---|---|---|
| Binder | PVdF | a | — | — | — | — | — |
| | | b | 50 | — | — | — | — |
| | | c | — | — | — | — | — |
| | | d | — | 70 | 30 | 30 | 30 |
| | Fluorine-containing polymer | A | 50 | 30 | 70 | — | — |
| | | B | — | — | — | — | — |
| | | C | — | — | — | — | — |
| | | D | — | — | — | 70 | — |
| | | E | — | — | — | — | 70 |
| | | F | — | — | — | — | — |
| | | G | — | — | — | — | — |
| Electrode density (g/cm³) | | | 3.5 | 3.5 | 3.5 | 3.3 | 3.3 |
| Flexibility | | | ○ | ○ | ○ | ○ | ○ |
| Electrode adhesion (N/mm) | | | 0.1 | 0.04 | 0.04 | 0.02 | 0.02 |
| Cell characteristics evaluation | Initial discharge capacity (mAh/g) | | 144 | 140 | 141 | 141 | 140 |
| | Initial internal resistance (DC)(Ω) | | 1.39 | 1.50 | 1.42 | 1.45 | 1.47 |
| | Cycle retention (%) | | 88 | 77 | 77 | 72 | 69 |

| | | | Example 11 | Example 12 | Example 13 | Example 14 | Example 15 | Example 16 | Comparative Example 7 |
|---|---|---|---|---|---|---|---|---|---|
| Binder | PVdF | d | — | — | — | — | — | — | 80 |
| | | e | 80 | — | — | 80 | — | — | — |
| | | f | — | 80 | — | — | 80 | — | — |
| | | g | — | — | 80 | — | — | 80 | — |
| | Fluorine-containing polymer | A | 20 | 20 | 20 | — | — | — | 20 |
| | | H | — | — | — | 20 | 20 | 20 | — |
| Electrode density (g/cm³) | | | 3.5 | 3.5 | 3.5 | 3.5 | 3.5 | 3.5 | 3.5 |
| Flexibility | | | ○ | ○ | ○ | ○ | ○ | ○ | ○ |
| Electrode adhesion (N/mm) | | | 0.13 | 0.15 | 0.18 | 0.14 | 0.16 | 0.18 | 0.04 |
| Cell characteristics evaluation | Initial discharge capacity (mAh/g) | | 143 | 143 | 143 | 143 | 143 | 143 | 140 |
| | Initial internal resistance (DC)(Ω) | | 1.48 | 1.48 | 1.47 | 1.48 | 1.48 | 1.47 | 1.5 |
| | Cycle retention (%) | | 88 | 89 | 90 | 89 | 90 | 91 | 79 |
| | High temperature cycle retention (%) | | 47 | 47 | 48 | 52 | 52 | 53 | 20 |

Examples 17 and 18, Comparative Examples 8 and 9

Preparation of Positive Electrode Mixture $LiCoO_2$ (available from Nippon Chemical Industrial Co., Ltd.), a binder, and acetylene black (available from DENKI KAGAKU KOGYO K.K.) were weighed such that the mass ratio of $LiCoO_2$:binder:acetylene black was 92:3:5.

The binder used was a mixture of a fluorine-containing polymer and PVdF at the mass ratio shown in Table 3.

The binder was dissolved in N-methyl-2-pyrolidone (NMP) to a concentration of 5% by mass. The obtained NMP solution was mixed with predetermined amounts of $LiCoO_2$ and acetylene black. The mixture was stirred at 100 rpm for 60 minutes with a stirrer (T.K.HIVIS MIX available from PRIMIX Corporation), and then additionally stirred at 100 rpm for 30 minutes while a vacuum deaeration treatment was performed. The stirred NMP solution was filtered through a Ni mesh (200 mesh) to achieve uniformity of the particle size of the solid components. Thereby, a positive electrode mixture was obtained.

(Preparation of Positive Electrode)

The prepared positive electrode mixture was left to stand for 24 hours following the preparation. Thereafter, the mixture was applied to Al foil (thickness: 22 μm, available from TOYO ALUMINIUM K.K.) as a collector with an applicator in such an amount that the positive electrode coating should have a dry mass of 16 to 17 mg/cm². After the application, the coating was dried with an air-blowing constant-temperature thermostat (Yamato Scientific Co., Ltd.) at 120° C., thereby completely evaporating NMP. Thus, a positive electrode was prepared.

The positive electrode was subjected to the following evaluations. The results are shown in Table 3.
<Electrode Density>
The positive electrode was passed through a roll press machine having a gap of 75 μm at 70° C. twice. Subsequently, the gap was changed to 35 μm, and the electrode was passed through the machine twice. Thereafter, the area, the thickness, and the weight of the positive electrode were measured to calculate the electrode density (g/cm$^3$).
<Flexibility (Folding Test of Positive Electrode)>
The prepared positive electrode was cut to a size of 3 cm long×6 cm wide. The electrode was folded 180° and then unfolded. The presence or absence of cracks on the positive electrode was visually checked. If no crack was observed, the positive electrode was evaluated as "o." If a crack was observed, the positive electrode was evaluated as "x."

TABLE 3

| | | | Example 17 | Example 18 | Comparative Example 8 | Comparative Example 9 |
|---|---|---|---|---|---|---|
| Binder | PVdF | a | 70 | — | 70 | 70 |
| | | b | — | — | — | — |
| | | c | — | 70 | — | — |
| | | d | — | — | — | — |
| | Flourine-containing polymer | A | — | — | — | — |
| | | B | 30 | 30 | — | — |
| | | C | — | — | — | — |
| | | D | — | — | — | — |
| | | E | — | — | — | — |
| | | F | — | — | 30 | — |
| | | G | — | — | — | 30 |
| Electrode density (g/cm$^3$) | | | 3.5 | 3.5 | 3.3 | 3.3 |
| Flexibilty | | | O | O | X | X |

Examples 19 to 24, Comparative Examples 10 and 11

Preparation of Positive Electrode Mixture

LiNi$_{1/3}$Co$_{1/3}$Mn$_{1/3}$O$_2$ (hereinafter also referred to as NMC, available from Nippon Chemical Industrial Co., Ltd.) or Li(NimoCo$_{0.15}$Al$_{0.05}$)O$_2$ (hereinafter also referred to as NCA, available from TODAKOGYO Corporation), a binder, and acetylene black (available from DENKI KAGAKU KOGYO K.K.) were weighed such that the mass ratio of NMC or NCA:binder:acetylene black was 93:3:4.

The binder used was a mixture of a fluorine-containing polymer and PVdF. The mass ratio between the fluorine-containing polymer and PVdF is shown in Table 4.

The binder was dissolved in N-methyl-2-pyrolidone (NMP) to a concentration of 5% by mass. The obtained NMP solution was mixed with predetermined amounts of LiNi$_{1/3}$Co$_{1/3}$Mn$_{1/3}$O$_2$ (NMC) or LiNi$_{0.80}$Co$_{0.15}$Al$_{0.05}$O$_2$ (NCA) and acetylene black. The mixture was stirred at 100 rpm for 60 minutes with a stirrer (T.K.HIVIS MIX available from PRIMIX Corporation), and then additionally stirred at 100 rpm for 30 minutes while a vacuum deaeration treatment was performed. The stirred solution was filtered through a Ni mesh (200 mesh) to achieve uniformity of the particle size of the solid components. Thereby, a positive electrode mixture was obtained.

The prepared positive electrode mixture was left to stand for 24 hours following the preparation. Thereafter, the mixture was applied to Al foil (thickness: 22 μm, available from TOYO ALUMINIUM K.K.) as a collector with an applicator in such an amount that the positive electrode coating should have a dry mass of 13 mg/cm$^2$. After the application, the coating was dried with an air-blowing constant-temperature thermostat (Yamato Scientific Co., Ltd.) at 120° C., thereby completely evaporating NMP. Thus, a positive electrode was prepared.

The positive electrode mixture and positive electrode prepared above were subjected to the following evaluations. The results are shown in Table 4.
<Stability (Viscosity Retention (%))>
The viscosity of the obtained positive electrode mixture was measured with a rheometer (a stress controlled rheometer Discovery HR-1 available from TA Instrument).

The viscosity (η0) right after the preparation of the mixture and the viscosity (ηa) 24 hours after the preparation of the mixture were measured, and the viscosity retention (Xa) was calculated in accordance with the equation below. The viscosity of the mixture herein means a viscosity value at a shear rate of 100 sec$^{-1}$ in the measurement using a cone and plate geometry (diameter: 40 mm, cone angle: 1°) at 25° C. while the shear rate was swept from 0.01 sec$^{-1}$ to 1000 sec$^{-1}$.

$Xa = \eta a/\eta 0 \times 100 [\%]$

<Electrode Density>
The positive electrode was passed through a roll press machine (gap: 0 μm, pressure: 0.5 t) at room temperature, and the area, the thickness, and the weight of the positive electrode were measured to calculate the electrode density (g/cm$^3$).
<Electrode Adhesion (90 Degree Peel Test at Interface Between Electrode and Collector Interface)>
The positive electrode was cut into a size of 1.2×8.0 cm. The electrode side of the positive electrode was fixed to a movable jig, and a piece of tape was applied to the collector side. The tape was pulled at 90° at a speed of 100 ram/min, and a stress (N/mm) caused by the pulling of the tape was measured with an autograph. The autograph was equipped with a 1 N load cell.
(Preparation of Coin Cell)
A circular shape (diameter: 13 mm) was stamped out of each of a lithium metal and the positive electrode obtained above with a punching machine. A micro-porous polypropylene film was interposed between this circular positive electrode and the negative electrode obtained above, and then a nonaqueous electrolyte is poured to provide a coin cell. The nonaqueous electrolyte used was prepared by dissolving LiPF$_6$ at a concentration of 1 mol/L in a mixed solvent of ethylene carbonate and ethyl methyl carbonate in a volume ratio of 3/7.
<Initial Internal Resistance>
The prepared coin cell was charged at a constant current (0.2 C)-constant voltage (4.1 V) and then discharged at 0.2 C to a discharge cut-off voltage of 3.0 V, at a temperature of 25° C. This charge and discharge cycle was repeated three times. Thereafter, the cell with a state of charge (SOC) of 100% was allowed to discharge at 0.2 C, 0.5 C, 1 C, 5 C, or 10 C, and a decrease in voltage (decrease in voltage at 15 seconds from the start of discharging) at each discharge current was measured. The internal resistance (Ω) was calculated from the slope of the plot of the current values and the decreases in voltage.
<High Rate Characteristics>
The prepared coin cell was charged at a constant current (0.2 C)-constant voltage (4.1 V) and then discharged at 0.2 C to a discharge cut-off voltage of 3.0 V, at a temperature of 25° C. This charge and discharge cycle was repeated three times. Thereafter, the discharge capacity was measured at a 0.2 C rate and at a 10 C rate at a voltage in the range of 4.1 V to 3.0 V. The charge conditions employed after the first three cycles was a constant current (0.5 C)-constant voltage (4.1 V) at a 0.5 C rate. The discharge capacity at a 10 C rate relative to that at a 0.2 C rate is regarded as the characteristic value at a rate of 10 C.

TABLE 4

| | | | Example 19 | Example 20 | Example 21 | Example 22 | Example 23 | Example 24 | Comparative Example 10 | Comparative Example 11 |
|---|---|---|---|---|---|---|---|---|---|---|
| Binder | PVdF | d | — | — | — | — | — | — | 80 | — |
| | | e | 80 | — | 80 | — | — | — | — | — |
| | | g | — | 80 | — | 80 | 80 | 80 | — | 100 |
| | Fluorine-containing polymer | A | 20 | 20 | — | — | 20 | — | 20 | — |
| | | H | — | — | 20 | 20 | — | 20 | — | — |
| Type of positive electrode active material in electrode mixture | | | NMC | NMC | NMC | NMC | NCA | NCA | NMC | NCA |
| Viscosity of electrode mixture | (η0) Right after preparation of mixture [Pa · s] | | 4.1 | 4.13 | 4.15 | 4.1 | 4.18 | 4.14 | 4.1 | 4.19 |
| | (ηa) 24 hours after preparation [Pa · s] | | 3.62 | 3.65 | 3.71 | 3.71 | 3.42 | 3.45 | 3.56 | (gelled) |
| | (Xa) Viscosity retention (after 24 hours) [%] | | 88 | 88 | 89 | 90 | 82 | 83 | 87 | (gelled) |
| Electrode density (g/cm³) | | | 2.5 | 2.5 | 2.5 | 2.5 | 2.5 | 2.5 | 2.5 | — |
| Electrode adhesion (N/mm) | | | 0.25 | 0.28 | 0.25 | 0.29 | 0.21 | 0.25 | 0.07 | — |
| Cell characteristics evaluation | Initial internal resistance (DC) (Ω) | | 2.04 | 1.98 | 1.97 | 1.95 | 1.95 | 1.94 | 2.34 | — |
| | High rate characteristics (%) | | 44 | 45 | 45 | 47 | 37 | 39 | 26 | — |

INDUSTRIAL APPLICABILITY

The electrode mixture of the present invention can be extremely suitably used as an electrode mixture for a non-aqueous electrolyte secondary cell such as a lithium ion secondary cell.

The invention claimed is:

1. An electrode mixture comprising:
   a powdery electrode material;
   a binder; and
   an organic solvent,
   the binder comprising polyvinylidene fluoride and a fluorine-containing polymer comprising a polymer unit based on vinylidene fluoride and a polymer unit based on tetrafluoroethylene,
   the fluorine-containing polymer comprising the polymer unit based on vinylidene fluoride in an amount of 80.5 to 90.0 mol % based on all the polymer units, and
   the polyvinylidene fluoride having a number average molecular weight of 150,000 to 1,400,000.

2. The electrode mixture according to claim 1, wherein the polyvinylidene fluoride has a number average molecular weight of 200,000 to 1,300,000.

3. The electrode mixture according to claim 1, wherein the fluorine-containing polymer comprises the polymer unit based on vinylidene fluoride in an amount of 82.0 to 89.0 mol % based on all the polymer units.

4. The electrode mixture according to claim 1, wherein the fluorine-containing polymer consists only of the polymer unit based on vinylidene fluoride and the polymer unit based on tetrafluoroethylene.

5. The electrode mixture according to claim 1, wherein the fluorine-containing polymer has a weight average molecular weight of 50,000 to 2,000,000.

6. The electrode mixture according to claim 1, wherein the electrode mixture has a mass ratio of the fluorine-containing polymer to the polyvinylidene fluoride, represented by [(fluorine-containing polymer)/(polyvinylidene fluoride)], of 90/10 to 10/90.

7. The electrode mixture according to claim 1, wherein the organic solvent comprises N-methyl-2-pyrolidone and/or N,N-dimethylacetamide.

* * * * *